(12) United States Patent
Takeda

(10) Patent No.: US 6,985,075 B2
(45) Date of Patent: Jan. 10, 2006

(54) OBSTACLE DETECTION APPARATUS AND METHOD

(75) Inventor: Nobuyuki Takeda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 99 days.

(21) Appl. No.: 10/653,613

(22) Filed: Aug. 28, 2003

(65) Prior Publication Data

US 2004/0056950 A1    Mar. 25, 2004

(30) Foreign Application Priority Data

Sep. 25, 2002  (JP)  .............................. 2002-278422

(51) Int. Cl.
*B60Q 1/00*    (2006.01)
(52) U.S. Cl. ...................... 340/435; 340/436; 340/937; 348/148
(58) Field of Classification Search ................ 340/435, 340/436, 932.2, 933, 935, 937; 382/106, 382/154, 284; 348/135, 142, 418; 345/419, 345/634
See application file for complete search history.

(56) References Cited

U.S. PATENT DOCUMENTS

| 5,729,216 | A | * | 3/1998 | Sasaki et al. ................ 340/937 |
| 5,784,429 | A | * | 7/1998 | Arai .............................. 378/38 |
| 6,205,242 | B1 | * | 3/2001 | Onoguchi .................... 382/154 |
| 6,373,897 | B1 | * | 4/2002 | Taniguchi .............. 375/240.21 |
| 6,389,179 | B1 | * | 5/2002 | Katayama et al. .......... 382/284 |
| 6,477,260 | B1 | * | 11/2002 | Shimomura ................. 382/106 |
| 2002/0191837 | A1 | | 12/2002 | Takeda et al. |
| 2004/0096082 | A1 | | 5/2004 | Nakai et al. |

FOREIGN PATENT DOCUMENTS

| JP | 2000-293693 | 10/2000 |
| JP | 2001-076128 | 3/2001 |

OTHER PUBLICATIONS

U.S. Appl. No. 09/659,815, filed Sep. 11, 2000, to Hattori et al.
Hattori, H. et al., "Stereo Without Depth Search and Metric Calibration", Proc. CUPR, pp. 177-184, (2000).

* cited by examiner

*Primary Examiner*—Van T. Trieu
(74) *Attorney, Agent, or Firm*—Finnegan, Henderson, Farabow, Garrett & Dunner, L.L.P.

(57) ABSTRACT

A stereo camera inputs a first image and a second image each including a predetermined plane. An image conversion unit projects each pixel of the predetermined plane from the first image onto a corresponding pixel of the second image as a third image. A feature conversion unit respectively emphasizes edges included in the first image, the second image and third image. A similarity calculation unit sets a plurality of areas on the predetermined plane from the second feature conversion image, calculates a first similarity between each area of the second feature conversion image and a corresponding area of the first feature conversion image, and calculates a second similarity between each area of the second feature conversion image and a corresponding area of the third feature conversion image. An obstacle decision unit detects an obstacle based on the first similarity and the second similarity.

18 Claims, 7 Drawing Sheets

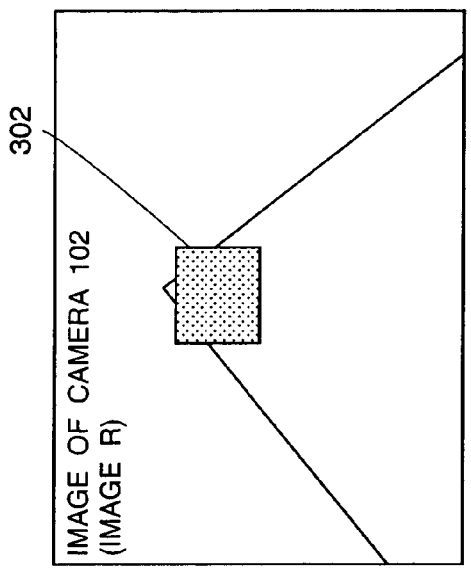
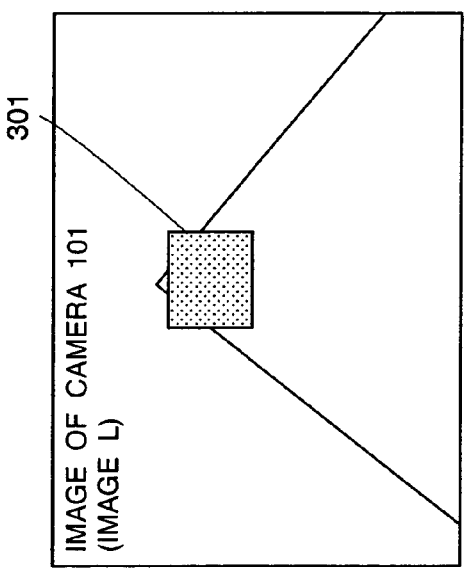
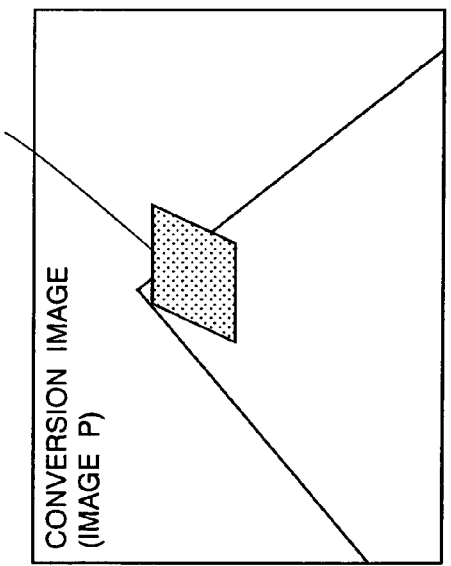
FIG. 3B
FIG. 3A

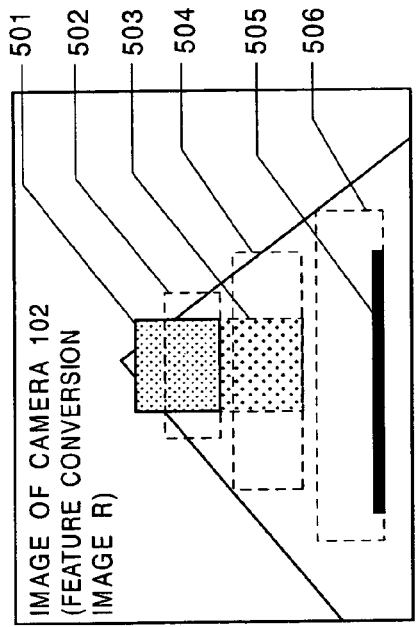
FIG. 5A
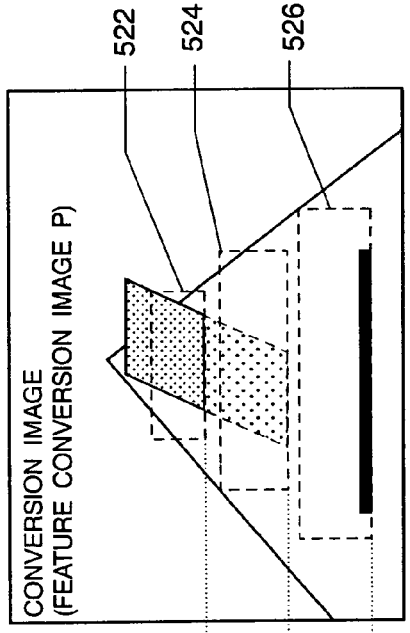
FIG. 5B
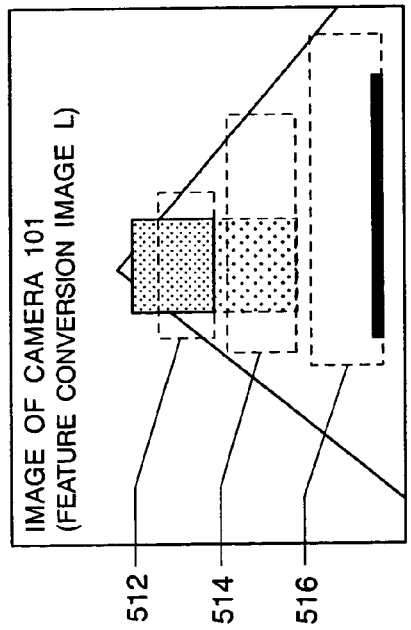
FIG. 5C
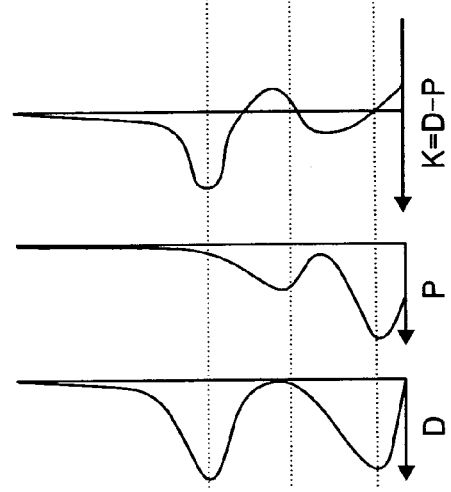

OBSTACLE DETECTION APPARATUS AND METHOD

CROSS-REFERENCE TO RELATED APPLICATIONS

This application is based upon and claims the benefit of priority from the prior Japanese Patent Application P2002-278422, filed on Sep. 25, 2002; the entire contents of which are incorporated herein by reference.

FIELD OF THE INVENTION

The present invention relates to an obstacle detection apparatus and method for detecting an obstacle existing on a road by using a pair of cameras.

BACKGROUND OF THE INVENTION

Common techniques to detect an obstacle typically use a laser or a supersonic wave, and a technique using a TV camera. The technique using the laser is typically expensive and not practical. The technique using the supersonic wave includes a problem for detection accuracy of the obstacle because resolution of the supersonic wave is usually low. Furthermore, in a single active sensor using the laser or the supersonic wave, a driving lane of a vehicle cannot be recognized.

On the other hand, the TV camera is relatively cheap and suitable for obstacle detection from a viewpoint of a resolution, instrumentation accuracy and an instrumentation area. Furthermore, the driving lane of the vehicle can be recognized. In the case of using the TV camera, there are a method using one camera and a method using a plurality of cameras (stereo camera). In the method using one camera, a road area and an obstacle area are separated from an image input through the one camera by using information such as intensity, a color, or a texture. For example, an area of intermediate intensity (brightness is low), e.g., a gray area, is extracted from the image as the road area. Otherwise, an area of few textures is extracted from the image as the road area. In this case, an area (except for the road area in the image) is regarded as an obstacle area.

The method using a plurality of cameras is called "a stereopsis". In general, the stereopsis is a technique to calculate a three-dimensional coordinate of arbitrary point of the image in a coordinate system (hereafter, it is called a stereo camera coordinate) fixed to the stereo camera. The obstacle is detected using three-dimensional information obtained by the stereopsis.

In the stereopsis, for example, two cameras are located at the right and left sides, a point in three-dimensional space is corresponded between the right image and the left image, and a three-dimensional position of the point is calculated by using a triangulation. If a position and a posture of each camera for a road plane are previously measured, a height of an arbitrary point in the image from the road plane can be calculated by using the stereopsis. Briefly, the obstacle area is separated from the road area on the image by calculating the height. In the method using one camera, the obstacle object cannot be correctly separated from the road area because many obstacles of which intensity, color or texture is similar to actual road exist. In the stereopsis, such problem can be avoided.

However, normal stereopsis includes a problem, i.e., a search of corresponding points, which is one element to prevent a realization of the stereopsis. The search of corresponding points is calculation necessary to correspond the same point in space with the right and left images. The calculation quantity is extremely large and the processing speed is often slow.

A method for fastly detecting an obstacle on the road using the stereo camera without the search of corresponding points is disclosed in Japanese Patent Publications (Kokai) P2001-76128 and P2000-293693. In this method, a road surface is assumed as a plane and an image conversion equation T to correspond a pixel point of the road surface on one camera image (camera image 1) with a corresponding pixel of the road surface on another camera image (camera image 2) is determined by a geometrical relationship between the stereo camera and the road surface. The obstacle is detected by a difference between the camera image 2 and an image (conversion image) converted from the camera image 1 using the image conversion equation T. Briefly, each pixel of the road area on the camera image 1 is correctly converted to a corresponding pixel of the road area on the camera image 2 by image conversion T. On the other hand, each pixel of the object area (obstacle area) having a height on the camera image 1 is not correctly converted to a corresponding pixel on the camera image 2. Accordingly, the obstacle is fastly detected using a difference between the camera image 2 and the conversion image.

However, in this method, it often happens that the object is not correctly detected. For example, if an obstacle, a component object or a scene reflects on a road surface which is wet by rain, it is difficult to correctly detect the obstacle or the object on the road surface. A reflection on the road surface is virtually regarded as an object having a negative height (a virtual image). Each pixel of the virtual image is not correctly converted to a corresponding pixel on another image by above-mentioned conversion method. In the same way as the obstacle, the reflection on the road surface causes a difference between the camera image 2 and the conversion image. Briefly, it often happens that the obstacle is not correctly detected from the image because of an erroneous difference caused by the reflection.

SUMMARY OF THE INVENTION

The present invention is directing to an obstacle detection apparatus and a method for correctly detecting an obstacle from stereo camera images without erroneous detection of a reflection of the obstacle on the road surface.

According to an aspect of the present invention, there is provided an obstacle detection apparatus, comprising: a pair of cameras inputting a first image and a second image each including a predetermined plane; an image memory configured to sequentially store the first image and the second image; an image conversion unit configured to project a coordinate of each pixel of the predetermined plane of the first image onto a coordinate of a corresponding pixel of the second image, the projected first image being a third image; a feature conversion unit configured to emphasize edges included in the first image, the second image and the third image, wherein the edge-emphasized first image, second image and third image being respectively a first feature conversion image, a second feature conversion image and a third feature conversion image; a similarity calculation unit configured to set a plurality of areas on the predetermined plane of the second feature conversion image, to calculate a first similarity between each area of the second feature conversion image and a corresponding area of the first feature conversion image, and to calculate a second similarity between each area of the second feature conversion image and a corresponding area of the third feature conversion image; and an obstacle decision unit configured to detect an obstacle based on the first similarity and the second similarity.

According to other aspect of the present invention, there is also provided an obstacle detection apparatus, comprising: a pair of cameras inputting a first image and a second image each including a predetermined plane; an image memory configured to sequentially store the first image and the second image; a feature conversion unit configured to emphasize edges included in the first image and the second image, wherein the edge-emphasized first image and second image being respectively a first feature conversion image and a second feature conversion image; an image conversion unit configured to project a coordinate of each pixel of the predetermined plane of the first image onto a coordinate of a corresponding pixel of the second image, the projected first feature conversion image being a third feature conversion image; a similarity calculation unit configured to set a plurality of areas on the predetermined plane of the second feature conversion image, to calculate a first similarity between each area of the second feature conversion image and a corresponding area of the first feature conversion image, and to calculate a second similarity between each area of the second feature conversion image and a corresponding area of the third feature conversion image; and an obstacle decision unit configured to detect an obstacle based on the first similarity and the second similarity.

According to still other aspect of the present invention, there is also provided a method for detecting an obstacle, comprising: inputting a first image and a second image including a predetermined plane through a pair of cameras; projecting a coordinate of each pixel of the predetermined plane of the first image onto a coordinate of a corresponding pixel of the second image, the projected first image being a third image; emphasizing edges included in the first image, the second image and the third image, wherein the edge-emphasized first image, second image and third image being respectively a first feature conversion image, a second feature conversion image and a third feature conversion image; setting a plurality of areas on the predetermined plane of the second feature conversion image; calculating a first similarity between each area of the second feature conversion image and a corresponding area of the first feature conversion image; calculating a second similarity between each area of the second feature conversion image and a corresponding area of the third feature conversion image; and detecting an obstacle based on the first similarity and the second similarity.

According to still other aspect of the present invention, there is also provided a method for detecting an obstacle, comprising: inputting a first image and a second image including a predetermined plane through a pair of cameras; emphasizing edges included in the first image and the second image, wherein the edge-emphasized first image and second image being respectively a first feature conversion image and a second feature conversion image; projecting a coordinate of each pixel of the predetermined plane of the first feature conversion image onto a coordinate of a corresponding pixel of the second feature conversion image, the projected first feature conversion image being a third feature conversion image; setting a plurality of areas on the predetermined plane of the second feature conversion image; calculating a first similarity between each area of the second feature conversion image and a corresponding area of the first feature conversion image; calculating a second similarity between each area of the second feature conversion image and a corresponding area of the third feature conversion image; and detecting an obstacle based on the first similarity and the second similarity.

BRIEF DESCRIPTION OF THE DRAWINGS

FIGS. 3A and 3B are schematic diagrams of examples of the stereo images and a conversion image from a left image according to one embodiment of the present invention.

FIGS. 5A, 5B and 5C are schematic diagrams of one example of detail processing of the object detection apparatus according to one embodiment of the present invention.

DETAILED DESCRIPTION OF THE EMBODIMENTS

Figure 1:
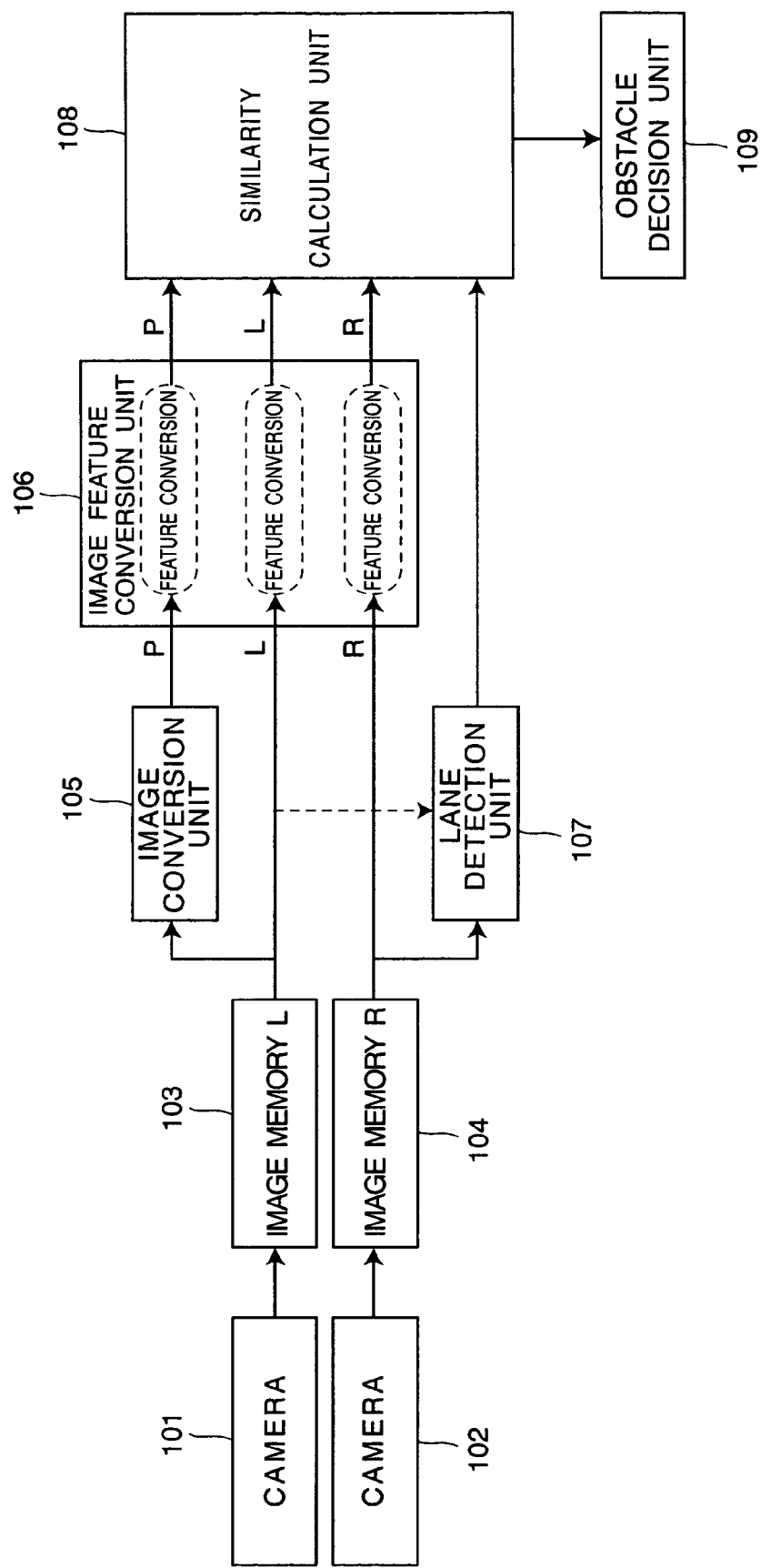
FIG. 1 is a block diagram of the obstacle detection apparatus according to one embodiment of the present invention.

Hereinafter, various embodiments of the present invention will be explained by referring to the drawings.

Figure 2A:
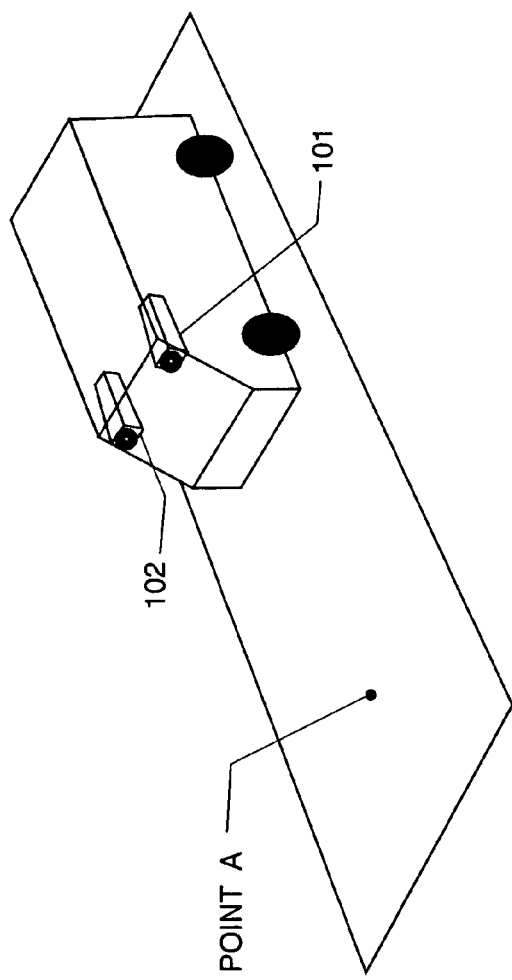
FIG. 2A is a schematic diagram of a scene in which the obstacle detection apparatus is used according to an embodiment of the present invention.

FIG. 1 is a block diagram of the obstacle detection apparatus accordingly to one embodiment of the present invention. In the embodiment, as shown in FIG. 2A, a left camera 101 and a right camera 102 as a stereo camera are mounted on a vehicle, and the vehicle is moving on a road as a basis plane. The vehicle on which the stereo camera is loaded is called a self-vehicle. A situation that an obstacle, such as a preceding vehicle or a pedestrian on the road, is detected is supposed.

As used herein, those skilled in the art will understand that the term "unit" is broadly defined as a processing device (such as a server, a computer, a microprocessor, a microcontroller, a specifically programmed logic circuit, an application specific integrated circuit, a discrete circuit, etc.) that provides the described communication and functionality desired. While such a hardware-based implementation is clearly described and contemplated, those skilled in the art will quickly recognize that a "unit" may alternatively be implemented as a software module that works in combination with such a processing device.

Depending on the implementation constraints, such a software module or processing device may be used to implement more than one "unit" as disclosed and described herein. Those skilled in the art will be familiar with particular and conventional hardware suitable for use when implementing an embodiment of the present invention with a computer or other processing device. Likewise, those skilled in the art will be familiar with the availability of different kinds of software and programming approaches suitable for implementing one or more "units" as one or more software modules.

In FIG. 1, the obstacle detection apparatus includes the above-mentioned camera 101, an image memory L 103 which sequentially stores an image L input by the camera 101 from the left side of the vehicle, the above-mentioned camera 102, an image memory R 104 which sequentially stores an image R input by the camera 102 from the right side of the vehicle, and an image conversion unit 105 which converts the image L based on a view position of the camera 102 for the road plane and generates an image P as the converts result. Furthermore, the obstacle detection apparatus includes an image feature conversion unit 106 which respectively converts feature of the image P, the image L and the image R by filter processing and respectively generates a feature conversion image P, a feature conversion image L and a feature conversion image R as the conversion result. The apparatus also includes a lane detection unit 107 which detects a traveling lane of the self-vehicle by using the image R and a similarity calculation unit 108 which calculates a similarity of each area between the feature conversion image R and the feature conversion image L and a similarity of each area between the feature conversion image R and the feature conversion image P by using the feature conversion image P, the feature conversion L, the feature conversion image R and information of the traveling lane of the self-vehicle. The apparatus further includes an obstacle decision unit 109 which decides whether an obstacle exists in each area of the image by using the similarity of each area. As to each unit except for the cameras 101 and 102 in the obstacle detection apparatus, all or a part of each function may be realized by executing a computer program.

In the obstacle detection apparatus, first, the image L is converted from a view position of the camera 102 as for the road plane, and the image P is generated as the conversion image. Next, feature conversion is executed for the image L, the image R and the image P by a filter to extract and emphasize edges, and the feature conversion image L, the feature conversion image R and the feature conversion image P are generated as the feature conversion result. Because of executing the feature conversion, calculation of a similarity (explained afterwards) can be accelerated.

On the other hand, a road or traveling lane of the self-vehicle is detected using the image R. The detected traveling lane is used for calculation of similarity. A plurality of areas (various areas) are set in an area of the traveling lane, and calculating of similarity is executed for each area. The calculation of similarity is executed for a similarity D between the feature conversion image R and the feature conversion image L and a similarity P between the feature conversion image R and the feature conversion image P. Detection of an obstacle is executed using a difference between the similarity D and the similarity P.

In detection of the obstacle of the prior art, a similarity between the image P and the image R is used. As mentioned-above, a reflection on a road surface is regarded as an object having a negative height. It often happens that the reflection area is erroneously detected as the obstacle. However, in an embodiment of the present invention, the obstacle is detected using a difference K between the similarity D and the similarity P. Accordingly, the case that the reflection on a road surface is erroneously detected as the obstacle is cancelled, and the obstacle can be accurately detected.

In detection of obstacle of the prior art, feature conversion is not executed for the image. Briefly, the image P, the image R and the image L are used as it is. Furthermore, a method of normalized correlation is used for calculation of similarity. The normalized correlation includes a defect that computation cost is high and processing speed is low. If SAD (Sum of Absolute Difference) or SSD (Sum of Square Difference) is used for calculation of similarity, computation cost is few and processing speed is high. However, it is difficult that the obstacle is detected by calculation of the similarity SAD or SSD from an image of which feature is not converted. Because an edge element is not clear in the image, a difference between two images is hard to detect. Accordingly, in an embodiment of the present invention, feature conversion is executed for the image L, the image R and the image P in order to extract and emphasize edge element. Then, the similarity of each area between two images is calculated using SAD or SSD in order to detect the obstacle. As a result, the obstacle can be detected at high speed. In addition to this, there is one effect for feature conversion. A joint and a blur are not shown in the image. Accordingly, detection accuracy of the obstacle further rises.

The image memory L 103 and the image memory R 104 sequentially store images from a stereo camera fixed on the vehicle. The image memory L 103 stores an image L from the left side of the vehicle by the camera 101. The image memory R 104 stores an image R from the right side of the vehicle by the camera 102. As explained afterward, a plane is assumed to be located on a road face, and a similarity between corresponding areas of two images input from the camera 101 and the camera 102 is calculated. Accordingly, in following explanation, assume that two optical axes of the two cameras are parallel and a tilt of the camera around the axis does not occur. However, in a limit that correction (for example, tilt correction) of the camera image is possible or the shift is ignored as error, two optical axes of the two cameras may not be parallel or a tilt of the camera around the axis may occur.

The image conversion unit 105 converts the image L input from the camera 101 by a conversion equation guided from a geometrical relationship between the stereo camera and the road plane. This conversion equation represents a conversion of the road plane from a view position of the camera 101 to a view position of the camera 102. The image conversion unit 105 generates an image P as the conversion result of the image L.

Figure 2B:
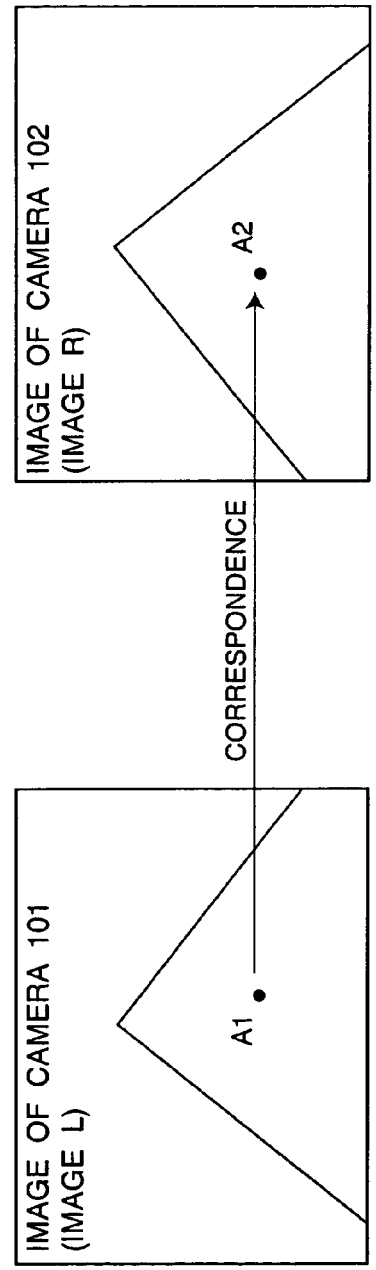
FIG. 2B is a schematic diagram of correspondence two points between stereo images according to an embodiment of the present invention.

Next, concrete processing of the image conversion unit 105 is explained. Assume that an arbitrary point A on the road is photographed by the camera 101 and the camera 102 as shown in FIG. 2A, and assume that an image L is input from the camera 101 and an image R is input from the camera 102 as shown in FIG. 2B. In this case, the image conversion represents a correspondence between a point $A_1$ of the image L and a point $A_2$ of the image R. Briefly, the road plane included in the image L input from the camera 101 is converted to the same road plane included in an image R input from the camera 102. An equation of this image conversion T is explained as follows.

In general, a position (projection position) of the road plane in the image L input from the camera 101 can be geometrically converted to a corresponding position of the road plane in the image R (basis image) input from the camera 102. For example, assume that camera parameter of the camera 102 is represented by "4×3" matrix as follows.

$$\begin{bmatrix} x_2 \\ y_2 \\ 1 \end{bmatrix} = \begin{bmatrix} p_{11} & p_{12} & p_{13} & p_{14} \\ p_{21} & p_{22} & p_{23} & p_{24} \\ p_{31} & p_{32} & p_{33} & p_{34} \end{bmatrix} \begin{bmatrix} X \\ Y \\ Z \\ 1 \end{bmatrix} \quad (1)$$

In above equation (1), "(X,Y,Z)" is a coordinate in space and "(x,y)" is a coordinate in image. In the same way, camera parameter of camera 101 is represented by "4×3" matrix as follows.

$$\begin{bmatrix} x_1 \\ y_1 \\ 1 \end{bmatrix} = \begin{bmatrix} q_{11} & q_{12} & q_{13} & q_{14} \\ q_{21} & q_{22} & q_{23} & q_{24} \\ q_{31} & q_{32} & q_{33} & q_{34} \end{bmatrix} \begin{bmatrix} X \\ Y \\ Z \\ 1 \end{bmatrix} \quad (2)$$

In this case, a constraint condition of the point on the road plane is represented as follows.

$$[a \quad b \quad c \quad d] \begin{bmatrix} X \\ Y \\ Z \\ 1 \end{bmatrix} = 0 \quad (3)$$

By simultaneously solving above equations (1) (2) (3), an conversion equation from "$(x_1,y_1)$" to "$(x_2,y_2)$" is obtained as follows.

$$\begin{bmatrix} x_2 \\ y_2 \\ 1 \end{bmatrix} = \begin{bmatrix} r_{11} & r_{12} & r_{13} \\ r_{21} & r_{22} & r_{23} \\ r_{31} & r_{32} & r_{33} \end{bmatrix} \begin{bmatrix} x_1 \\ y_1 \\ 1 \end{bmatrix} \quad (4)$$

In above equation (4), "3×3" matrix (each element is "$r_{11}$~$r_{33}$") is a matrix of image conversion T.

The image conversion T (producing image P) represents projection from a position of the road plane on the image L to a position of the road plane on the image R. Briefly, as for a point on the road plane, the point on the image L is correctly converted to a corresponding point on the image R. Reversely, as for a point not on the road plane, the point does not satisfy relationship of the equation (4), and the point on the image L is not converted to a corresponding point (correct point) on the image R. In actual conversion, as shown in FIG. 3A, an obstacle 301 in the image L input from the camera 101 is converted to a distorted obstacle 303. Briefly, an object having a height in space is converted with a distortion falling onto the image. If two cameras are fixed on the vehicle, it is apparent that a matrix of the image conversion T is a fixed value. Accordingly, only nine values "$r_{11}$~$r_{33}$" of the equation (4) are stored as parameters of image conversion matrix. Furthermore, suitable values of these parameters are obtained by calibration at timing that this obstacle detection apparatus is mounted on the vehicle. If two cameras are fixed on the vehicle, it is apparent that a matrix of the image conversion T is a fixed value. Accordingly, only nine values "$r_{11}$~$r_{33}$" of the equation (4) are stored as parameters of image conversion matrix. Further-more, suitable values of these parameters are obtained by calibration at timing that this obstacle detection apparatus is mounted on the vehicle.

The lane detection unit 107 detects a traveling lane area on the road from the image R. For example, at least one white line is detected from the image R by edge detection (such as a Hough transformation). A driving lane along advance direction of the self-vehicle is regarded as the white line on the road. Accordingly, an area in the driving lane or the neighboring lane can be detected. If an area on the road can be detected by another mark or symbol, the lane mark explicitly represented by the white line is not always necessary. Any method may be used as a lane detection method. If necessary, as shown in a dotted line of FIG. 1, the image L with the image R may be used to detect the lane area.

The image feature conversion unit 106 converts feature of the image L, the image R and the image P in order to extract and emphasize edges included in each image, and respectively generates the feature conversion image L, the feature conversion image R and the feature conversion image P as the feature conversion result. In this case, edge elements are extracted from the image and emphasized. Even if the similarity calculation unit (explained afterward) calculates a similarity by using SAD or SSD, a difference between two images is clearly detected. In an embodiment of the obstacle detection apparatus of the present embodiment, a high pass filter (HPF) is used as a feature conversion means. Especially, a two-dimensional filter of general linear characteristic or a saturated HPF to saturate a pixel value over a threshold by intentionally setting a high gain can be used in order to extract and emphasize edge.

Application example of the saturated HPF is explained. For example, an upper limit of pixel value is set as "255", and coefficient "1.5" is multiplied with pixel value of each pixel. As for pixels of which original pixel value is "0~170", converted pixel value is one and a half times of the original pixel value. On the other hand, as for pixels of which original pixel value is "171~255", converted pixel value is over "255". Accordingly, the converted pixel value is uniquely set as "255".

Various methods can be used as the feature conversion method. Instead of above-mentioned saturation processing, non-linear processing such as γ (gamma) conversion, binarization or multilevel quantization can be added to output of two-dimensional HPF. Alternatively, application result of arbitrary method of edge detection generally used for image processing may be regarded as the feature conversion image. Furthermore, general processing of contrast emphasis is effective.

By executing this conversion processing, for example, a clear edge (such as a white line on the road surface) remains clear while a blurred pattern such as blurs on the road surface is relatively more blurred and not shown. Briefly, a clear edge (such as a boundary line of the obstacle) is relatively emphasized and shown.

In an embodiment of the present embodiment, the same feature conversion processing is respectively executed for the image L, the image R and the image P. However, it is not necessary that the same feature conversion processing as the image L and the image R is executed for the image P. In a limit that processing of the obstacle decision unit 109 (explained afterward) is correctly executed, the feature conversion processing of the image P may be different from the feature conversion processing of the image L and the image R.

Figure 4:
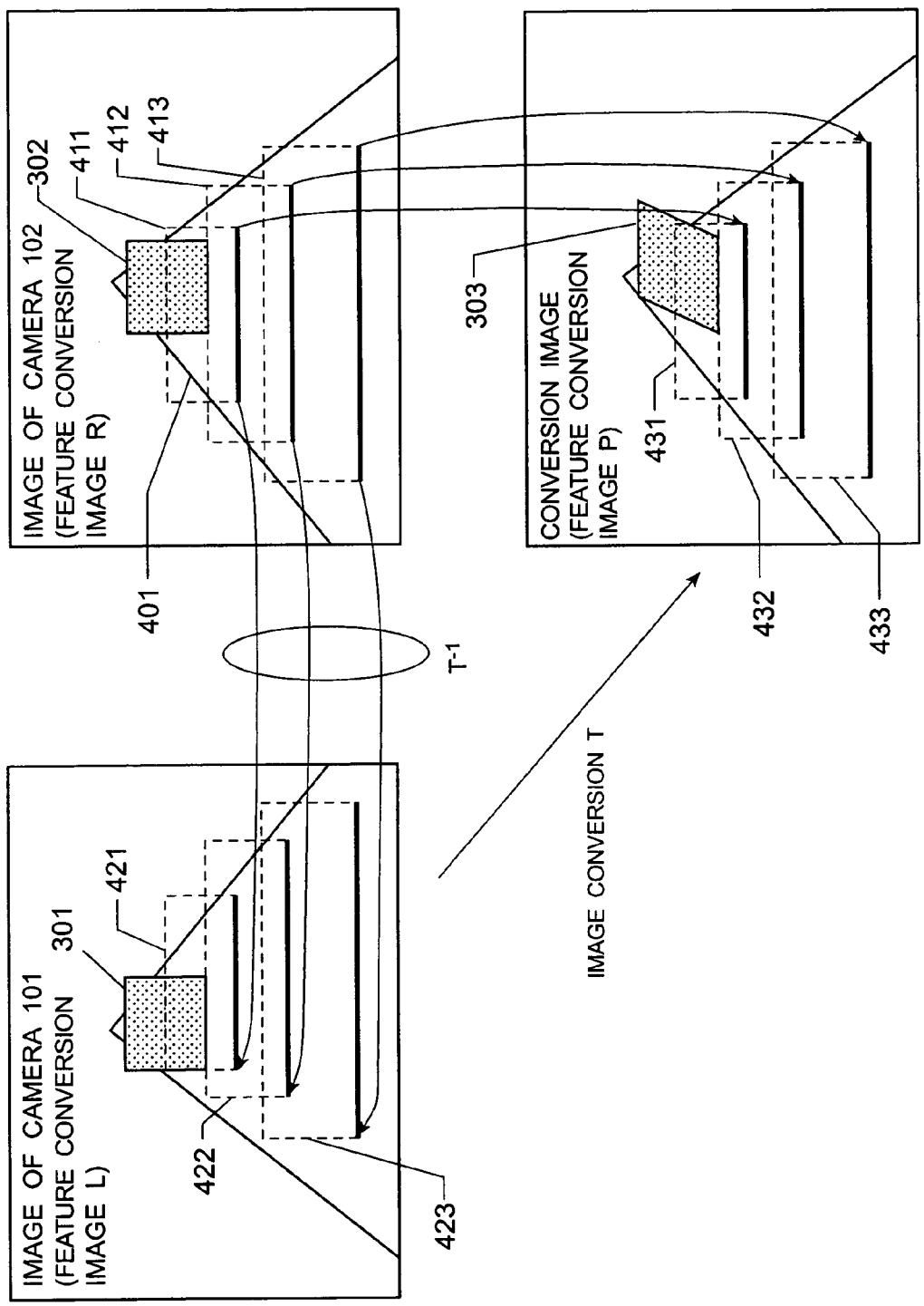
FIG. 4 is a schematic diagram of set of a plurality of processing areas on the stereo images and the conversion image according to one embodiment of the present invention.

The similarity calculation unit 108 receives a lane area of the feature conversion image from the lane detection unit 107, and sets a plurality of processing areas each of which the base is differently a horizontal pixel line on the lane area under an assumption that an obstacle exists on a road surface. Last, the similarity calculation unit 108 calculates a similarity of each area between the feature conversion image R and the feature conversion image L and a similarity of each area between the feature conversion image R and the feature conversion image P. FIG. 4 is a schematic diagram of one example of the plurality of processing areas set on the lane area. In FIG. 4, X-axis direction is a horizontal direction on a screen and Y-axis direction is a vertical direction on the screen. Assume that an obstacle exists in front of the self-vehicle, and a surface of the vehicle, e.g., a face photographed as an image, is regarded as a plane for a distance from the camera to the obstacle. Briefly, the surface of the obstacle is regarded to be perpendicular to an optical axis of the camera. In this case, each horizontal pixel line (a line parallel to x-axis) on the lane area is assumed as a ground line between the road plane and the obstacle. By changing y-coordinate, each rectangle area is sequentially set on the feature conversion image R under a condition that the base of each area is each horizontal pixel line on the lane area. Concretely, a shape of the rectangle processing area (a number of pixels along a horizontal direction and a vertical direction) is determined based on y-coordinate value and a width of the ground line of the y-coordinate value (a lane width along x-direction on the image). Furthermore, a horizontal position of the processing area is determined based on the lane width or the y-coordinate value. The number of pixels along the horizontal direction and the vertical direction and the horizontal position of each processing area are represented as a function of the y-coordinate value. This function is suitably determined from a limit of size of the obstacle to be detected at creation timing of the apparatus. Set example of each processing area is shown as areas 411, 412, 413 of the feature conversion image R in FIG. 4. These areas are respectively set as an assumption that the base is the ground line.

Next, an area of the feature conversion image L and the feature conversion image P is set in correspondence with each processing area of the feature conversion image R. The base (lower side) of each processing area on the feature conversion image R is projected by inverse conversion $T^{-1}$ of the image conversion T onto the feature conversion image L. The projected base is set as the base of the corresponding area on the feature conversion image L. A size of the corresponding area of the feature conversion image L is the same as a size of the area of the feature conversion image R. For example, in FIG. 4, each area 421, 422 and 423 on the feature conversion image L respectively corresponds to each area 411, 412 and 413 on the feature conversion image R. The inverse conversion $T^{-1}$ is a conversion to offset a parallax caused by the stereo camera at the ground line (the lowest pixel line of the processing area). Each corresponding area of the feature conversion image P is set at the same coordinate position of the processing area of the feature conversion image R. For example, in FIG. 4, each area 431, 432 and 433 on the feature conversion image P respectively corresponds to each area 411, 412 and 413 on the feature conversion image R. As a correspondence relation among each processing area in FIG. 4, the area 411 (feature conversion image R), the area 421 (feature conversion image L) and the area 431 (feature conversion image P) mutually correspond. The area 412 (feature conversion image R), the area 422 (feature conversion image L) and the area 432 (feature conversion image P) mutually correspond. The area 413 (feature conversion image R), the area 423 (feature conversion image L) and the area 433 (feature conversion image P) mutually correspond. As for each corresponding area, a similarity is respectively calculated between the feature conversion image R and the feature conversion image L and between the feature conversion image R and the feature conversion image P. The similarity is calculated by SAD or SSD. An equation of SAD is represented as follows.

$$S_D = \frac{1}{N_D} \sum^{N_D} |I_R - I_L| \tag{5}$$

$$S_P = \frac{1}{N_P} \sum^{N_P} |I_R - I_P|$$

An equation of SSD is represented as follows.

$$S_D = \frac{1}{N_D} \sum^{N_D} (I_R - I_L)^2 \tag{6}$$

$$S_P = \frac{1}{N_P} \sum^{N_P} (I_R - I_P)^2$$

In above equations (5) and (6), "$S_D$" is the SAD value or the SSD value between the feature conversion image R and the feature conversion image L. "$S_P$" is the SAD value or the SSD value between the feature conversion image R and the feature conversion image P. "$I_R$", "$I_L$" and "$I_P$" are respectively pixel value of the feature conversion image R, the feature conversion image L and the feature conversion image P. "$N_D$" and "$N_P$" are respectively a number of valid pixels of the processing area set for calculation of the similarity D and the similarity P. The smaller the SAD value or the SSD value, the higher the similarity. The larger the SAD value or the SSD value, the lower the similarity. Accordingly, some conversion of the SAD value or SSD value is necessary. In the present embodiment, the similarity D and the similarity P are respectively set by inverting a sign of the SAD value or SSD value. The similarity D and the similarity P are respectively calculated for each processing area set by changing y-coordinate value on the feature conversion image R. Hereafter, the similarity is described as a similarity D(y) and a similarity P(y).

The obstacle decision unit 109 detects an obstacle using the similarity D(y) and the similarity P(y) calculated by the similarity calculation unit 108. In this case, detection of the obstacle is decided using a difference K(y) represented by following equation.

$$K(y) = \text{similarity } D(y) - \text{similarity } P(y) \tag{7}$$

For example, the obstacle is decided by detecting a position of which the difference K(y) is the maximum on the feature conversion image. In the case of simply searching for the maximum of the difference K(y), even if the obstacle does not exist in the road plane, there is a possibility of error detection. Accordingly, searching using the maximum of the difference K(y) above a predetermined threshold is desired. A position of the obstacle decided by the obstacle decision unit 109 is converted to actual distance information by using characteristic of the camera, and it is used as control information by an automatic driving apparatus or a safety apparatus of the vehicle. In the case of detecting a plurality of obstacles, each position of a local maximum value above a predetermined threshold is searched instead of the maximum value.

Hereafter, the obstacle detection processing in the case of reflecting the object on the road plane is explained by referring to FIGS. 5A, 5B and 5C. As shown in FIG. 5B, assume that an obstacle 501 exists in front of the self-vehicle on the road plane, a stop line 505 (one pattern on the road surface) is drawn at this side in front of the self-vehicle on the road plane. Now, the obstacle 501 is reflected on the road surface as a reflection 503 because the road surface gets wet. In this case, if the reflection is not clear on the road plane, the effect is ignored by feature conversion. Accordingly, in this example, assume that the reflection 503 is clear on the road plane.

As mentioned-above, each processing area is set in one embodiment by changing the y-coordinate along a vertical direction on the feature conversion image R. In order to simplify the explanation, a ground line between the obstacle 501 and the road surface, a horizontal line of the reflection 503 nearest to the self-vehicle and a horizontal line of the stop line 505 nearest to the self-vehicle are only considered as each processing area 502, 504 and 506. First, the base (the lowest horizontal pixel line) of each processing area 502, 504 and 506 on the feature conversion image R is projected onto the feature conversion image L by inverse conversion $T^{-1}$, Concretely, both edge points of the base of each processing area 502, 504 and 506 of the feature conversion image R in FIG. 5B is converted to both edge points of the base of a corresponding area 512, 514 and 516 of the feature conversion image L in FIG. 5A. In this way, each processing area 512, 514 and 516 is set on the feature conversion image L.

Next, each corresponding area of which position is the same as each processing area of the feature conversion image R is set on the feature conversion image P in FIG. 5C. In this way, each processing area 522, 524 and 526 is set on the feature conversion image P. Briefly, as for correspondence relation for the same y-coordinate, three processing areas 502, 512 and 522 correspond, three processing areas 504, 514 and 524 correspond, and three processing areas 506, 516 and 526 correspond.

By using these processing areas, a similarity D and a similarity P are calculated for each y-coordinate. The calculation method is qualitatively explained without actual calculation of the similarity. First, the similarity is calculated for the processing area corresponding to the ground line of the obstacle 501. In FIGS. 5A and 5B, the processing area 502 corresponds to the processing area 512. As mentioned-above, the base of the processing area 512 is set by projecting the base of the processing area 502 using the inverse conversion $T^{-1}$ onto the feature conversion image L. A height and a width of the processing area 512 are the same as the processing area 502. The inverse conversion $T^{-1}$ is a conversion of offset parallax of the stereo camera on the road surface. Accordingly, by projecting the base of the processing area 502 onto the feature conversion image L using the inverse conversion $T^{-1}$, a positional relationship of the obstacle 501 between the processing area 502 and the processing area 512 is relatively preserved. Concretely, a relation position of the obstacle 501 in the processing area 502 is the same as a relation position of the obstacle in the processing area 512. A similarity between the processing area 502 and the processing area 512 is high. In other words, the similarity D is high at a position of the ground line of the obstacle 501. On the other hand, a position of the ground line of the processing area 522 on the feature conversion image P is the same as a position of the ground line of the processing area 502 on the feature conversion image R. However, an object in the processing area 522 is distorted by the image conversion T. Accordingly, a similarity between the processing area 502 and the processing area 522 is low. In other words, the similarity P is low at a position of the ground line of the obstacle 501. As a result, the difference K between the similarity D and the similarity P is a positive large value at the position of the ground line of the obstacle 501.

Next, the similarity is calculated for the processing area corresponding to a horizontal pixel line of the reflection 503 nearest to the self-vehicle (hereafter, it is called the nearest horizontal line). In FIGS. 5A and 5B, the processing area 504 corresponds to the processing area 514. The base of the processing area 514 is set by projecting the base of the processing area 504 using the inverse conversion $T^{-1}$ onto the feature conversion image L. A height and a width of the processing area 514 are the same as the processing area 504. The nearest horizontal line of the reflection 503 is virtually viewed as the upper end of an object having a negative height. In other words, the nearest horizontal line of the reflection 503 does not actually exist on the road surface, which is different from the ground line of the obstacle 501. Accordingly, by projecting the base of the processing area 504 onto the feature conversion image L using the inverse conversion $T^{-1}$, a positional relationship of the reflection 503 between the processing area 504 and the processing area 514 is not relatively preserved. As a result, a relative position of the nearest horizontal line of the reflection 503 in the processing unit 514 is different from a relative position of the nearest horizontal line of the reflection 503 in the processing area 504. A similarity between the processing area 504 and the processing area 514 is low. In other words, the similarity D is low at a position of the nearest horizontal line of the reflection 503. On the other hand, as shown in FIG. 5C, the reflection in the processing area 524 is distorted by the image conversion T, and a similarity between the processing area 504 and the processing area 524 is low. In other words, the similarity P is low at the position of the nearest horizontal line of the reflection 503. As a result, the difference K between the similarity D and the similarity P is a positive small value or a negative large value at the position of the nearest horizontal line of the reflection 503.

Last, a similarity is calculated for the processing area corresponding to a horizontal pixel line of the stop line 505 nearest to the self-vehicle (Hereafter, it is called the nearest horizontal line). In FIGS. 5A and 5B, the processing area 506 corresponds to the processing area 516. The nearest horizontal line of the stop line 505 is a drawn pattern on the road surface. Accordingly, by projecting the base of the processing area 506 onto the feature conversion image L using the inverse conversion $T^{-1}$, a positional relationship of the stop line 505 between the processing area 506 and the processing area 516 is relatively preserved. A similarity between the processing area 506 and the processing area 516 is high. In other words, the similarity D is high at a position of the nearest horizontal line of the stop line 505. On the other hand, as shown in FIG. 5C, the stop line is not distorted by the image conversion T because the stop line 505 is actual pattern drawn on the road surface with limited weight or depth. Accordingly, a similarity between the processing area 506 and the processing area 526 is high. In other words, the similarity P is high at the position of the nearest horizontal line of the stop line 505. As a result, the difference between the similarity D and the similarity P is a positive small value or a negative large value at the position of the nearest horizontal line of the stop line 505. As shown in the left side graph of FIG. 5C, by using the difference K between the similarity D and the similarity P, the obstacle is correctly detected by excluding the reflection and the drawn mark on the road.

In an embodiment of the present embodiment, the feature conversion image is used for calculation of the similarity instead of the original image. In the case of calculating the similarity using the original image, a normalization correlation method of which computation cost is high and calculation speed is low may be used by the reason explained afterward. However, in an embodiment of the present invention, by using the feature conversion image, SAD and SSD of which computation cost is few and calculation speed is high can be used. Though SAD and SSD are calculated at high speed, if contrast between the obstacle and the background (road surface) is low in the image, it often happens that the obstacle is not correctly separated from non-obstacle area. In general, contrast between the obstacle and the background is low in the original image, and SAD and SSD are not used for decision of the obstacle. Concretely, first, in the case that contrast of texture in the obstacle area or contract between the obstacle and the background is low on the image, the similarity is affected by smooth change of intensity in the processing area. Second, the stereo camera is two cameras each fixed at different position. Even if the two cameras capture the same object in space, this object is not always photographed as two same feature images as surface characteristic (reflection characteristic) of the obstacle or the road. Third, even if the two cameras have the same component, each photographic characteristic does not strictly coincide. This is one reason why two different feature images are photographed. Accordingly, a difference of features between two images becomes a noise element. If a contrast of texture of the obstacle or the road surface is near this noise element or small, the obstacle decision unit 109 (explained afterward) cannot correctly decide the obstacle and non-obstacle.

In an embodiment of the present invention, the image feature conversion unit 106 eliminates a smooth change element on the image by converting feature of each image. Briefly, the change element caused by difference of photograph condition becomes relatively small. As a result, the obstacle decision unit 109 can correctly decide the obstacle and the non-obstacle.

Furthermore, as shown in the area 411 of FIG. 4, in the case that the obstacle 302 and the road surface 401 are mixedly included in the area, the saturation HPF is extremely effective to use as feature conversion means. Usually, a pattern of high contrast such as a lane mark and a speed limit display often appears on the road surface. In the case of calculating a similarity, such pattern of high contrast is often included in a processing area of the image. If there is no sufficient contrast between a texture of the obstacle surface and a background (typically, the road surface), even if the obstacle surface occupies almost part of the processing area, the similarity of the processing area depends on the pattern of high contrast. As a result, the similarity D is low, the similarity P is high, and the difference K is a negative value. Accordingly, in spite of the obstacle included in the processing area, the obstacle decision unit erroneously decides that the obstacle is not included in the processing area.

However, in an embodiment of the present invention, the feature conversion image is used for calculation of the similarity, and a texture of the obstacle surface and a boundary between the object and the background are emphasized. Though a pattern of high contrast on the road surface is also emphasized, this pattern is not emphasized over a predetermined limit by the saturation processing (saturated HPF). Accordingly, the similarity of the processing area relatively depends on the texture of the obstacle surface or the boundary between the obstacle and the background in the processing area. Briefly, even if a pattern such as the lane mark is included in the processing area, the obstacle decision unit correctly decides the obstacle included in the processing area.

As mentioned-above, in an embodiment of the present invention, the stereo camera images (image L, image R) and the conversion image (image P) generated by correspondence of each pixel of the road area between the stereo camera image, are prepared. Edges are extracted and emphasized in each image (image L, image R and image P). The similarity of each processing area between the feature converted stereo camera images (image L, image R) and the similarity of each processing area between the feature converted stereo camera image (image L) and the feature converted image (image P) are calculated. By analyzing the difference between two similarities, the obstacle on the road can be stably detected from the low contract image.

MODIFICATION EXAMPLE 1

Figure 6:
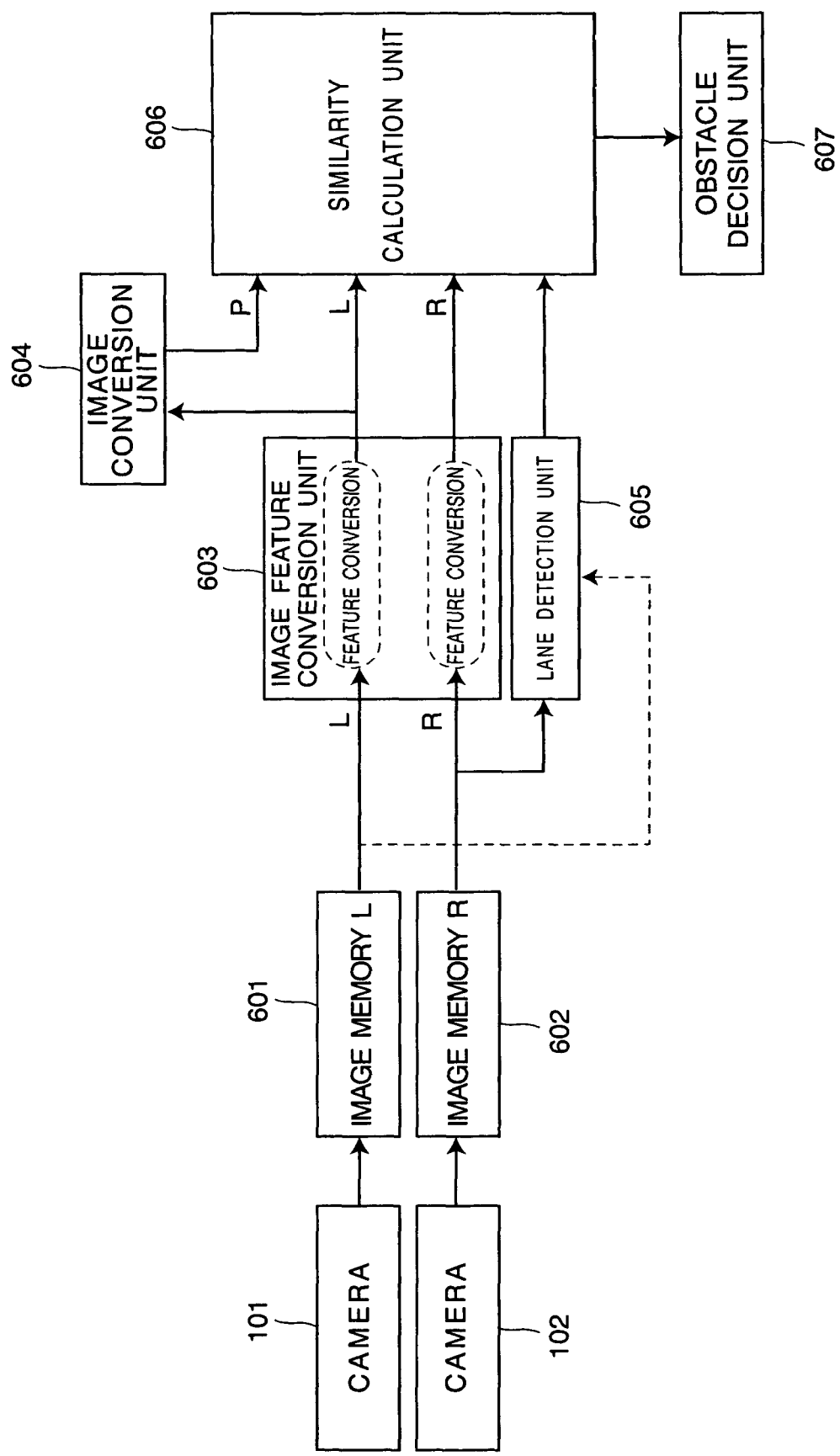
FIG. 6 is a block diagram of the obstacle detection apparatus according to a modification example of the present invention.

FIG. 6 is a block diagram of the obstacle detection apparatus according to modified example 1 of the present invention. In above-mentioned embodiment, feature conversion is respectively executed for the image L, the image R and the image P. However, in this modification, feature conversion is executed for the image L and the image R only, and the feature conversion image L and the feature conversion image R are generated. The feature conversion image L is converted by the image conversion T, and the feature conversion image P is generated. FIG. 6 shows a component of the obstacle detection apparatus to execute each processing in such order. In this component, computation cost for feature conversion can be reduced, and all processing is executed at high speed.

In general, if an exchange rule is not possible for two conversions (feature conversion, image conversion T), the processing results by two application orders (feature conversion→image conversion T, image conversion T→feature conversion) are different. Accordingly, a problem may occur as to whether execution order of the feature conversion and the image conversion T can be exchanged.

The image conversion T is a conversion to project each pixel of a road area on the image L onto a corresponding pixel of a road area on the image R. In the case of existing arbitrary pattern on the road surface, if a road area of the feature conversion image P (generated from the feature conversion image L by the image conversion T) is sufficiently similar to a road area of the feature conversion image R, there should be no problem based on order change of the feature conversion and the image conversion T.

Figure 7B:
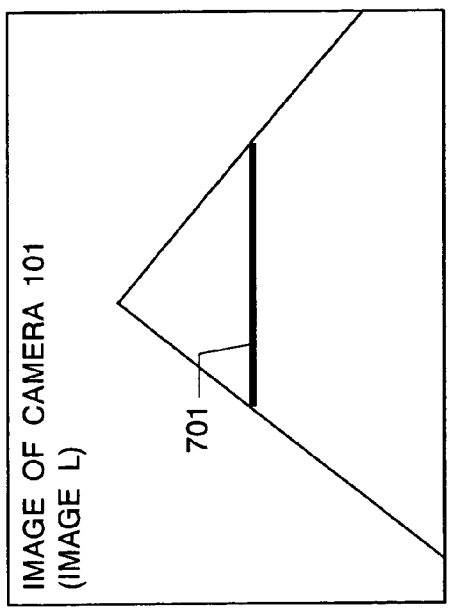
FIGS. 7A and 7B are schematic diagrams of examples of the stereo images and the conversion image from the left image according to the modification example of the present invention.
Figure 7B:
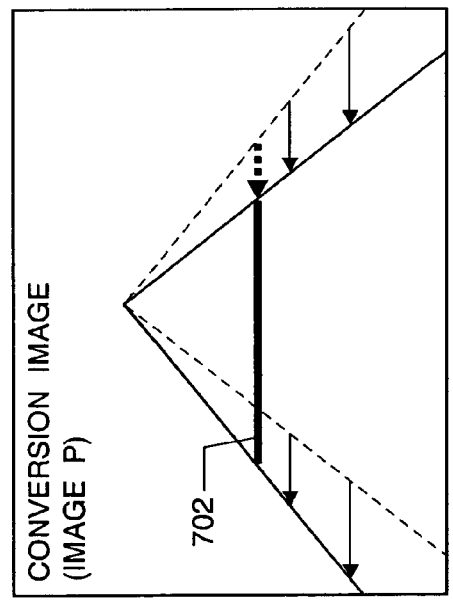
Figure 7A:
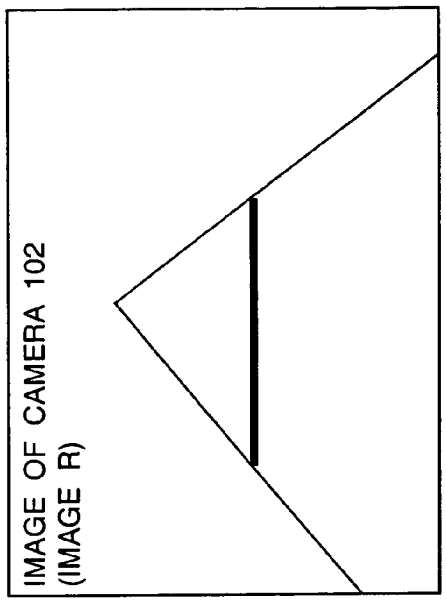

In the case of such component of the stereo camera (i.e., two parallel optical axes, no tilt, use in road environment), the image conversion T is regarded as parallel moving of each horizontal line of the image L along X-axis direction. Concretely, as shown in FIG. 7A, a horizontal line 701 is shifted to a horizontal line 702 by parallel moving along X-axis direction. Accordingly, if the feature conversion by the image feature conversion unit 603 is irrelevant to Y-axis direction such as one-dimensional HPF (or saturation HPF) along X-axis direction, the road area of the feature conversion image P is sufficiently similar to the road area of the feature conversion image R.

As mentioned-above, in this modification example shown in FIG. 6, after edges are extracted and emphasized in the stereo camera images (image L, image R) by the feature conversion, each pixel of the road area between the stereo camera images are corresponded by the image conversion T. Accordingly, the calculation quantity can be reduced and the obstacle on the road surface can be detected at higher speed.

MODIFICATION EXAMPLE 2

The similarity calculation unit 108 generates a reduced image based on at least one reduction ratio for the image L, the image R and the image P. The reduction ratio is determined by a height, a width, or an area of the processing area. For example, the height and the width of an original image are respectively reduced by a half as the reduction ratio. In this case, an area of the reduced image is a quarter of an area of the original image. The similarity D and the similarity P are calculated for each processing area between two reduced images. By such processing, if a size of the processing area is large, the computation cost can be reduced.

MODIFICATION EXAMPLE 3

The obstacle decision unit 109 detects the obstacle from the image by a threshold processing for the equation (7). An equation of the threshold processing is represented as follows.

$$K_{th}(y) = \begin{cases} 0 & K(y) < Th \\ K(y) & K(y) \geq Th \end{cases} \quad (8)$$

However, as shown in graph "K" of FIG. 5C, the graph includes an extension (convex range) of which center is a position of the obstacle. Accordingly, if a following equation is satisfied for a range "y" ($0 < y \leq y_0$), it is decided that the obstacle is not included in the range "y".

$$\sum_{y=0}^{y_0} K_{th}(y) = 0 \quad (9)$$

Furthermore, as for a range "y" from "0" to the maximum along y-axis direction, "$y_1$" is searched to minimize a following equation.

$$\left| \alpha \sum_{y=0}^{max} K_{th}(y) - \sum_{y=0}^{y_1} K_{th}(y) \right| \quad (10)$$

In the equation (10), "$\alpha$" is a constant ($0 < \alpha \leq$). By solving this equation (10), "$y_1$" may be set as a position of the obstacle. In FIG. 5C, "$y_1$" represents y-coordinate of the base of the processing area 522.

MODIFICATION EXAMPLE 4

The similarity calculation unit 108 calculates the similarity D(y) and the similarity P(y) for the processing area previously set on each image. However, in correspondence with a position of the processing area set on the feature conversion image R, a processing area is shifted around the position on the feature conversion image L and the feature conversion image P, and a similarity between each shifted processing area (the feature conversion image L, the feature conversion image P) and the processing area (feature conversion image R) is respectively calculated. The maximum is output as the similarity D(y) or the similarity P(y). In this modification, even if conversion error of the image conversion T is caused by a vibration of the vehicle or a slope of the road, the obstacle can be detected at high accuracy.

MODIFICATION EXAMPLE 5

The similarity calculation unit 108 sets one processing area corresponding to each y-coordinate on the feature conversion image R, and calculates the similarity D(y) and the similarity P(y) for each processing area. Then, the obstacle decision unit 109 detects the obstacle by using the similarity D(y) and the similarity P(y) corresponding to each y-coordinate. However, the similarity calculation unit 108 prepares a plurality of functions to determine a horizontal position, a width and a height of the processing area. Each processing area is set by each of the plurality of function, and the similarity D(y) and the similarity P(y) are calculated for each processing area. Briefly, the similarity D(y) and the similarity P(y) as the same number of the functions are respectively obtained. The obstacle decision unit 109 detects a position of the obstacle for each function. In this case, the obstacle detection unit 109 may output a position of the obstacle nearest to the self-vehicle, or may output all positions of a plurality of obstacles. This output mode is selected based on a form and a purpose of the apparatus to use the position of the obstacle.

MODIFICATION EXAMPLE 6

In one embodiment, the similarity calculation unit 108 sets a rectangular processing area on the feature conversion image R. However, a shape of the processing area may be arbitrary if the processing area of the same shape is set on the feature conversion image R, the feature conversion image L and the feature conversion image P. An essence of the present invention does not change based on a difference of the shape of the processing area.

MODIFICATION EXAMPLE 7

In the above-mentioned embodiment, the image is obtained by two cameras (the left camera 101 and the right camera 102). However, by setting the third camera on the self-vehicle, the same processing as images from the left camera 101 and the right camera 102 may be executed for an image obtained from the third camera in order to detect the obstacle. In this case, at least two positions of the obstacle are calculated. In the same way as the modification example 5, a position of the obstacle nearest to the self-vehicle may be output or the at least two positions of the obstacle may be output. Furthermore, in the same way as a positional relationship between the camera 101 and the camera 102, there is a condition that an optical axis of the third camera is parallel to at least one of the camera 101 and the camera 102 and the third camera does not tilt around the optical axis. However, in a limit that correction (for example, tilt correction) of the camera image is possible or the shift is ignored as error, two optical axes of the two cameras may not be parallel or a tilt or the third camera around the axis may occur.

As mentioned-above, in an embodiment of the present invention, as for the stereo camera images and the converted image generated by projecting each pixel of the road area of one image onto another image, after feature is emphasized in each image, the obstacle is detected by calculating the similarity of each processing area between two feature conversion images. Accordingly, the obstacle on the road is correctly detected at high speed.

For embodiments of the present invention, the processing of the present invention can be accomplished by a computer-executable program, and this program can be realized in a computer-readable memory device.

In embodiments of the present invention, the memory device, such as a magnetic disk, a floppy disk, a hard disk, an optical disk (CD-ROM, CD-R, DVD, and so on), an optical magnetic disk (MD, and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

In embodiments of the present invention, the computer executes each processing stage of the embodiments according to the program stored in the memory device. The computer may be one apparatus such as a personal computer or a system in which a plurality of processing apparatuses are connected through the network. Furthermore, in the present invention, the computer is not limited to the personal computer. Those skilled in the art will appreciate that a computer includes a processing unit in an information processor, a microcomputer, and so on. In short, the equipment and the apparatus that can execute the functions in embodiments of the present invention using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An obstacle detection apparatus, comprising;
a first camera inputting a first image including a predetermined plane and a second camera inputting a second image including the predetermined plane;
an image memory configured to sequentially store the first image and the second image;
an image conversion unit configured to project a coordinate of each pixel of the predetermined plane from the first image onto a corresponding coordinate of a corresponding pixel of the second image, the projected first image being a third image;
a feature conversion unit configured to emphasize a plurality of edges included in the first image, the second image and the third image, wherein the edge-emphasized first image, the edge-emphasized second image and the edge-emphasized third image respectively constitute a first feature conversion image, a second feature conversion image and a third feature conversion image;
a similarity calculation unit configured to set a plurality of areas of which bases are different pixel lines along a horizontal direction on the predetermined plane of the second feature conversion image; to determine a corresponding area of the first feature conversion image by inversely projecting each of the areas of the second feature conversion image onto the first feature conversion image, the inverse-projection representing an inverse-conversion of the projection by said image conversion unit; to calculate a first similarity between each of the areas of the second feature conversion image and the corresponding area of the first feature conversion image; and to calculate a second similarity between each of the areas of the second feature conversion image and a corresponding one of the areas of the third feature conversion image; and
an obstacle decision unit configured to detect an obstacle based on the first similarity and the second similarity.

2. The object detection apparatus according to claim 1, wherein said image conversion unit converts the coordinate of each pixel of the predetermined plane from the first image based on a view position of the second camera.

3. The object detection apparatus according to claim 2, wherein said feature conversion unit respectively multiplies each pixel value of the first image, the second image and the third image by a coefficient, and corrects each multiplied pixel value to a predetermined value if the multiplied pixel value is above the predetermined value.

4. An obstacle detection apparatus, comprising:
a first camera inputting a first image including a predetermined plane and a second camera inputting a second image including the predetermined plane;
an image memory configured to sequentially store the first image and the second image;
a feature conversion unit configured to emphasize a plurality of edges included in the first image and the second image, wherein the edge-emphasized first image and the edge-emphasized second image respectively constitute a first feature conversion image and a second feature conversion image;
an image conversion unit configured to project a coordinate of each pixel of the predetermined plane from the first feature conversion image onto a corresponding coordinate of a corresponding pixel of the second feature conversion image, the projected first feature conversion image being a third feature conversion image;
a similarity calculation unit configured to set a plurality of areas of which bases are different pixel lines along a horizontal direction on the predetermined plane of the second feature conversion image; to determine a corresponding area of the first feature conversion image by inversely projecting each of the areas of the second feature conversion image onto the first feature conversion image, the inverse-projection representing an inverse-conversion of the projection by said image conversion unit; to calculate a first similarity between each of the areas of the second feature conversion image and the corresponding area of the first feature conversion image; and to calculate a second similarity between each of the areas of the second feature conversion image and a corresponding one of the areas of the third feature conversion image; and an obstacle decision unit configured to detect an obstacle based on the first similarity and the second similarity.

5. The object detection apparatus according to claim 1 or 4,
wherein the first camera is one of a left side camera and a right side camera each being mounted on a vehicle, and
wherein the second camera is the other of the left side camera and the right side camera.

6. The object detection apparatus according to claim 5, wherein the first image and the second image include a front scene of the vehicle along a moving direction of the vehicle, and
wherein the predetermined plane is a road surface on which the vehicle is moving.

7. The object detection apparatus according to claim 6, further comprising a lane detection unit configured to respectively detect two lines from the first image and the second image, and to respectively detect the road surface from the first image and the second image by using the detection result of the two lines.

8. The object detection apparatus according to claim 4, wherein said feature conversion unit respectively multiplies each pixel value of the first image and the second image by a coefficient, and corrects and multiplied pixel value to a predetermined value if the multiplied pixel value is above the predetermined value.

9. The object detection apparatus according to claim 8, wherein said image conversion unit converts the coordinate of each pixel of the predetermined plane of the first feature conversion image based on a view position of the second camera.

10. The object detection apparatus according to claim 1 or 4,
wherein said similarity calculation unit determines the corresponding one of the area of the third feature conversion image by setting the same position of each of the areas of the second feature conversion image on the third feature conversion image.

11. The object detection apparatus according to claim 10, wherein said obstacle decision unit calculates a difference between the first similarity and the second similarity, and selects one of the areas based on the difference as an obstacle area.

12. The object detection apparatus according to claim 11, wherein said obstacle decision unit selects one of the areas having the largest difference above a threshold as the obstacle area.

13. The object detection apparatus according to claim 1 or 4,
wherein said similarity calculation unit respectively reduces the first feature conversion image, the second feature conversion images and the third feature conversion image by a predetermined reduction ratio; sets a plurality of areas on the predetermined plane of the reduced second feature conversion image, calculates a first similarity between each of the areas of the reduced second feature conversion image and the corresponding area of the reduced first feature conversion image; and calculates a second similarity between each of the areas of the reduced second feature conversion image and a corresponding one of the areas of the reduced third feature conversion image.

14. The object detection apparatus according to claim 1 or 4,
wherein said similarity calculation unit shifts the corresponding area on the first feature conversion image around a position of each of the areas of the second feature conversion image, respectively calculates a similarity between each shifted area of the first feature conversion image and each of the areas of the second feature conversion image, selects one similarity having the maximum as the first similarity, shifts the corresponding one on the third feature conversion image around a position of each of the areas of the second feature conversion image, respectively calculates a similarity between each shifted one of the third feature conversion image and each of the areas of the second feature conversion image, and selects one similarity having the maximum as the second similarity degree.

15. A method for detecting an obstacle, comprising:
inputting a first image including a predetermined plane through a first camera;
inputting a second image including the predetermined plane through a second camera,
projecting a coordinate of each pixel of the predetermined plane from the first image onto a corresponding coordinate of a corresponding pixel of the second image, the projected first image being a third image;
emphasizing a plurality of edges included in the first image, the second image and the third image; wherein the edge-emphasized first image, the edge-emphasized second image and the edge-emphasized third image respectively constitute a first feature conversion image, a second feature conversion image and a third feature conversion image;
setting a plurality of areas of which bases are different pixel lines along a horizontal direction on the predetermined plane of the second feature conversion image,
determining a corresponding area of the first feature conversion image by inversely projecting each of the areas of the second feature conversion image onto the first feature conversion image, the inverse-projection representing an inverse-conversion of the projection;
calculating a first similarity between each of the areas of the second feature conversion image and the corresponding area of the first feature conversion image;
calculating a second similarity between each of the areas of the second feature conversion image and a corresponding one of the areas of the third feature conversion image; and
detecting an obstacle based on the first similarity and the second similarity.

16. A method for detecting an obstacle, comprising:
inputting a first image including a predetermined plane through a first camera;
inputting a second image including the predetermined plane through a second camera;
emphasizing a plurality of edges included in the first image and the second image, wherein the edge-emphasized first image and the edge-emphasized second image respectively constitute a first feature conversion image and a second feature conversion image;
projecting a coordinate of each pixel of the predetermined plane from the first feature conversion image onto a corresponding coordinate of a corresponding pixel of the second feature conversion image, the projected first feature conversion image being a third feature conversion image;
setting a plurality of areas of which bases are different pixel lines along a horizontal direction on the predetermined plane of the second feature conversion image;
determining a corresponding area of the first feature conversion image by inversely projecting each of the areas of the second feature conversion image onto the first feature conversion image, the inverse-projection representing an inverse-conversion of the projection;

calculating a first similarity between each of the areas of the second feature conversion image and the corresponding area of the first feature conversion image;

calculating a second similarity between each of the areas of the second feature conversion image and a corresponding one of the areas of the third feature conversion image; and detecting an obstacle based on the first similarity and the second similarity.

17. A computer program product, comprising:

a computer readable program code embodied in said product for causing a computer to detect an obstacle, said computer readable program code comprising:

a first program code to input a first image including a predetermined plane through a first camera and to input a second image including the predetermined plane through a second camera;

a second program code to project a coordinate of each pixel of the predetermined plane from the first image onto a corresponding coordinate of a corresponding pixel of the second image, the projected first image being a third image;

a third program code to emphasize a plurality of edges included in the first image, the second image and the third image, wherein the edge-emphasized first image, the edge-emphasized second image and the edge-emphasized third image respectively constitute a first feature conversion image, a second feature conversion image and a third feature conversion image;

a fourth program code to set a plurality of areas of which bases are different pixel lines along a horizontal direction on the predetermined plane of the second feature conversion imagel;

a fifth program code to determine a corresponding area of the first feature conversion image by inversely projecting each of the areas of the second feature conversion image onto the first feature conversion image, the inverse-projection representing an inverse-conversion of the projection;

a sixth program code to calculate a first similarity between each of the areas of the second feature conversion image and the corresponding area of the first feature conversion image;

a seventh program code to calculate a second similarity between each of the areas of the second feature conversion image and a corresponding one of the areas of the third feature conversion image; and an eighth program code to detect an obstacle based on the first similarity and the second similarity.

18. A computer program product, comprising:

a computer readable program code embodied in said product for causing a computer to detect an obstacle, said computer readable program code comprising:

a first program code to input a first image including a predetermined plane through a first camera and to input a second image including the predetermined plane through a second camera;

a second program code to emphasize a plurality of edges included in the first image and the second image, wherein the edge-emphasized first image and the edge-emphasized second image respectively constitute a first feature conversion image and a second feature conversion image;

a third program code to project a coordinate of each pixel of the predetermined plane from the first feature conversion image onto a corresponding coordinate of a corresponding pixel of the second feature conversion image, the projected first feature conversion image being a third feature conversion image;

a fourth program code to set a plurality of areas of which bases are different pixel lines along a horizontal direction on the predetermined plane of the second feature conversion image;

a fifth program code to determine a corresponding area of the first feature conversion image by inversely projecting each of the areas of the second feature conversion image onto the first feature conversion image, the inverse-projection representing an inverse-conversion of the projection;

a sixth program code to calculate a first similarity between each of the areas of the second feature conversion image and the corresponding area of the first feature conversion image;

a seventh program code to calculate a second similarity between each of the areas of the second feature conversion image and a corresponding one of the areas of the third feature conversion image; and an eighth program code to detect an obstacle based on the first similarity and the second similarity.

* * * * *